United States Patent [19]

Yung et al.

[11] Patent Number: 5,761,475
[45] Date of Patent: Jun. 2, 1998

[54] COMPUTER PROCESSOR HAVING A REGISTER FILE WITH REDUCED READ AND/OR WRITE PORT BANDWIDTH

[75] Inventors: Robert Yung, Fremont; Neil Wilhelm, Menlo Park, both of Calif.

[73] Assignee: Sun Microsystems, Inc., Mountain View, Calif.

[21] Appl. No.: 414,873

[22] Filed: Mar. 31, 1995

Related U.S. Application Data

[63] Continuation of Ser. No. 356,596, Dec. 15, 1994, abandoned.

[51] Int. Cl.$^6$ ........................................................ G06F 9/00
[52] U.S. Cl. ........................................ 395/394; 395/391
[58] Field of Search ................................ 395/375, 393, 395/394, 395, 391, 390

[56] References Cited

U.S. PATENT DOCUMENTS

| | | | |
|---|---|---|---|
| 5,129,067 | 7/1992 | Johnson | 395/375 |
| 5,148,529 | 9/1992 | Ueda et al. | 395/393 |
| 5,222,240 | 6/1993 | Patel | 395/393 |
| 5,293,500 | 3/1994 | Ishida et al. | 395/375 |
| 5,377,336 | 12/1994 | Eickemeyer et al. | 395/375 |
| 5,537,561 | 7/1996 | Nakajima | 395/375 |
| 5,557,763 | 9/1996 | Senter et al. | 395/393 |

OTHER PUBLICATIONS

Sohi, Gurindar S., Instruction Issue Logic for High Performance, Interruptible, Multiple Functional Unit, Pipeline Computers, pp. 349-359 Mar. 90.

Popescu et al., The Metaflow Architectue, Jun. 1991, pp. 10-13, 63-71.

*Primary Examiner*—William M. Treat
*Assistant Examiner*—Patricia L. Winder
*Attorney, Agent, or Firm*—Flehr Hohbach Test Albritton & Herbert LLP

[57] ABSTRACT

A processor is disclosed. The processor relates to a processor having a register file of registers and a dispatch unit capable of issuing up to (i) instructions of a program per cycle to an execution unit having (z) pipelines, wherein some of the instructions specify certain ones of the registers in the register file as source operands and designate certain ones of the registers in the register file as destination registers. The processor also includes a memory for storing the registers of the register file, the memory having (N) access ports configured to access up to (N) registers per cycle, where (N) is less than a maximum number of register values that may need to be accessed during a cycle.

18 Claims, 4 Drawing Sheets

COMPUTER PROCESSOR HAVING A REGISTER FILE WITH REDUCED READ AND/OR WRITE PORT BANDWIDTH

This application is a continuation of application Ser. No. 08/356,596, entitled "A Register Cache for Providing Register Values to a Computer Processor", filed on Dec. 15, 1994, now abandoned.

BACKGROUND OF THE INVENTION

1. Field of the Invention

The present invention relates to computers and, more particularly, to a processor having a register file with a number of read and/or write ports that is less than the maximum number of read and/or write ports that may need to be accessed from the register file during a cycle.

2. Description of Related Art

Early processors contained a single stage execution unit. Instructions, in program order, were fed to the execution unit one instruction at a time. Any register values needed by the instruction for execution were provided by the register file just before the instruction entered the execution unit. After execution, the result of the instruction was stored back in the register file, and the above steps were repeated for the next instruction in the program. State of the art processors are now pipelined and super-scalar. In a pipelined processor, a number of stages are coupled together to form a pipeline. Each stage in the pipeline performs a specific operation. Instructions sequentially enter at the first stage of the pipeline, and with each clock cycle (hereafter referred to as "cycle"), the instructions are passed from one stage to the next. As an instruction progresses down the pipeline, the specific operation of each stage is performed on the instruction. At the last stage of the pipeline, execution of the instruction is completed. Since a pipelined processor can process multiple instructions at the same time, the throughput of the processor is improved. A super-scalar processor contains multiple pipelines, thereby further increasing the throughput of the processor. The scalarity of a processor refers to the number of pipelines in the processor.

Figure 1:
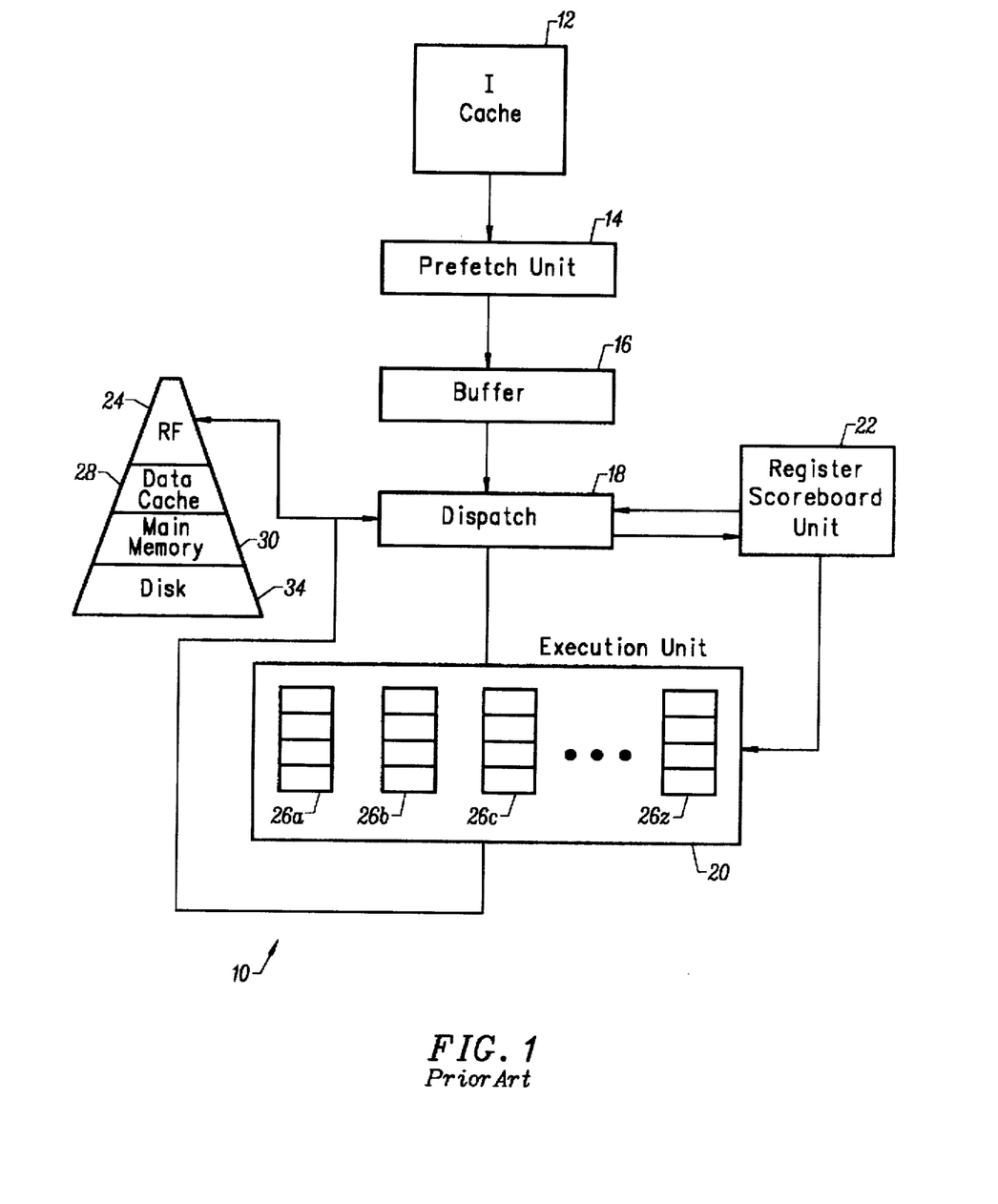
FIG. 1 illustrates a block diagram of a computer according to the prior art.

Referring to FIG. 1, a pipelined processor according to the prior art is shown. The processor 10 includes, among other elements, an instruction (I) cache 12, an instruction prefetch unit 14, an instruction buffer 16, a dispatch unit 18, an execution unit 20, a register scoreboard unit 22, and a memory hierarchy 24. The execution unit includes one or more pipelines 26a through 26z. The memory hierarchy 24 includes, from top to bottom, a register file (RF) 28, a data cache 30, the instruction cache 12, main memory 32, disk storage 34, and typically external memory (not shown). The main memory 32 and disk storage 34 typically store both data and instructions of a program.

The characteristics of the register file 28 are dictated by the instruction set developed for the processor 10. In other words, the instruction set defines the type and size of registers in the register file 28 available to the programmer. For example, the SPARC instruction set V9, jointly developed by Sun Microsystems, Inc., Mountain View, Calif. and SPARC International, Menlo Park, Calif., defines an integer register file having a maximum of five hundred and twenty (520) registers and a separate floating point register file, having up to thirty two (32) registers, and each register being sixty-four (64) bits wide. (Note, for the sake of simplicity, FIG. 1 illustrates a "generic" register file 28, and does not show separate integer and floating point register files.)

With all instruction sets, some instructions specify registers as either source registers or destination registers. Source registers contain the source values needed by an instruction to be executed. A destination register is used to store the result value after the instruction has been executed. Other instructions in the instruction set may not specify either source or destination registers. Table I below provides several examples of instructions that specify source registers, destination registers, or no registers.

TABLE I

| Instruction | Description |
| --- | --- |
| ADD R1, R2 —> R3 | The sum of the values contained in source register R1 and source register R2 are stored in destination register R3. |
| SUB R3, R4 —> R5 | The value in source register R3 minus the value in source register R4 is stored in destination register R5. |
| MOV R5 —> R6 | The value of source register R5 is moved to destination register R6. |
| IF CC. ZERO = 1, JMP to XXX | This instruction is an example of a conditional branch. If the zero flag of the condition code (CC) is set to one, control jumps to the specified address XXX. If the condition is not met, execution resumes at the next instruction in the program order. Note, this instruction defines no source or destination register values. |

The processor 10 is designed to issue up to a maximum of (i) instructions per cycle. During operation, the instructions of a program to be executed by the processor 10 are loaded into the instruction cache 12. The prefetch unit 14 fetches the instructions from the instruction cache 12, and places them into the instruction buffer 16 in program order. The dispatch unit 18 attempts to issue the next (i) instructions in the instruction buffer 16 in each cycle. The actual number of dispatched instructions per cycle, however, is dependent on two factors: (1) resource dependencies; and (2) register dependencies. Resource dependencies and register dependencies among the (z) instructions are then checked, and concurrently resolved in the following procedures:

1. In resolving resource dependencies, the dispatch unit 18 compares the resources available among the pipelines 26a through 26z of the execution unit 20 with the instructions in the next (i) instructions in the instruction buffer 16. For example, if the next (i) instructions includes three integer instructions, and the execution unit 20 only has two integer pipelines 26 available, then one of the integer instructions can not be dispatched in the current cycle. In effect, the dispatch unit 18 draws a "resource line" in the next (i) instructions considered for dispatch, and only those instructions below the resource line are considered for dispatch. Instructions above the resource line are considered for dispatch in a subsequent cycle.

2. In resolving register dependencies, the dispatch unit 18 ascertains the source registers needed by the instructions below the resource line in among the next (i) instructions considered for dispatch. The needed registers are then compared with those in the register scoreboard 22, which maintains a current record of all the register values being recomputed in the pipelines 26a through 26z. An instruction is said to be dependent if it needs a register value that is currently being recomputed by older instructions in one of the pipelines 26. If a register value becomes available in the execution unit 20 before the dependent instruction will need it, the instruction is dispatched without delay. On the otherhand, if the needed register value is not yet available when the dependent instruction is ready to be dispatched, the dispatch unit 18 may delay or "stall" the dispatch of that instruction. When the register value in conflict becomes available, the stalled instruction is then dispatched, and the register value is bypassed from the pipeline 26 that just recomputed the register value to the pipeline that needs the register value.

If an instruction below the resource line has no register conflicts, meaning the needed register value(s) are not being recomputed, then the register value(s) are obtained directly from the register file 28. The dispatch unit 18, in resolving resource and register dependencies, may issue fewer instructions than the processor 10 is capable of executing during a given cycle. Nevertheless, this operation is necessary to maintain proper execution of the instructions of the program. Further, some processors may avoid stalling by issuing instructions out of order. After instructions are executed, recomputed register values are stored in the register file 28. The results of the executed instructions, contained in the destination registers of the executed instructions, exit the pipelines 26a through 26z. The results are stored in the register file 28 so that up-to-date register values not being recomputed in the execution unit 20 are available for younger instructions.

State of the art microprocessors, such as the UltraSPARC™ processor from Sun Microsystems, the Power PC from Motorola and IBM, and the Alpha™ chip from Digital Equipment Corporation share a number of similarities. Each of these processors can issue up to four (i=4) instructions per cycle and each uses an on-chip static random access memory (SRAM) array for implementing their respective register files 28. The maximum number of access ports required to dispatch the four instructions (i=4) per cycle, however, varies from processor to processor. The factors that determine what the maximum bandwidth of read and write ports include (1) the number and type of pipelines 26 in the execution unit 20 of the processor, and (2) the type and source and destination register requirements of the instructions in the instruction set.

To the best of the Applicants knowledge, the UltraSPARC, Power PC, Alpha, and all other prior art processors, all provide a number of read and write ports to both the integer and floating point register files 28 equal to the maximum number of register read and write ports that may be needed during a "worst case" cycle. A worst case cycle, for purposes herein, is defined as a cycle wherein the largest possible number of source register values and/or destination register values that may be needed during a cycle.

For the sake of illustrating a worst case cycle, an example involving the UltraSPARC processor and the V9 instruction set is provided. The UltraSPARC processor includes nine (9) pipelines. The nine pipelines include two integer units, one load/store unit; two graphics units; one branch unit; one add floating point unit (FPU); one multiply FPU; one divide FPU; and one square root FPU. The V9 instruction set defines integer instructions that require up to two source register operands, and one destination operand. Load/store instruction can specify either one, two or three source operands. Floating point instructions can specify up to two source operands and one destination register.

In the example, consider a cycle in which four instructions (i=4) are considered for dispatch. The four instructions include three integer operations, each requiring two source operands, and one load/store operation, requiring three source operands. Since the UltraSPARC processor has just two integer units, only the two oldest integer instructions and the load/store instruction can be dispatched in the cycle.

Since the resources are not available to dispatch the third integer instruction, it is stalled until a later cycle. Under these conditions, a total of seven (7) register read ports and three (3) register write ports are required for the integer register file 28 in UltraSPARC. Since no other possible combination of dispatched instruction would require greater read port bandwidth at the register file 28, the above set of instructions represents a worst case example. Although an example is not provided herein, the the floating point register file 28 in UltraSPARC requires five read ports (5) and three (3) write ports. The number of read and write ports for the Power PC, the Alpha chip and other known processors is determined in a similar fashion by first determining the bandwidth requirements for the worst case cycle, and then providing the sufficient bandwidth for accessing the register file 28 in the worst case cycle.

Figure 2:
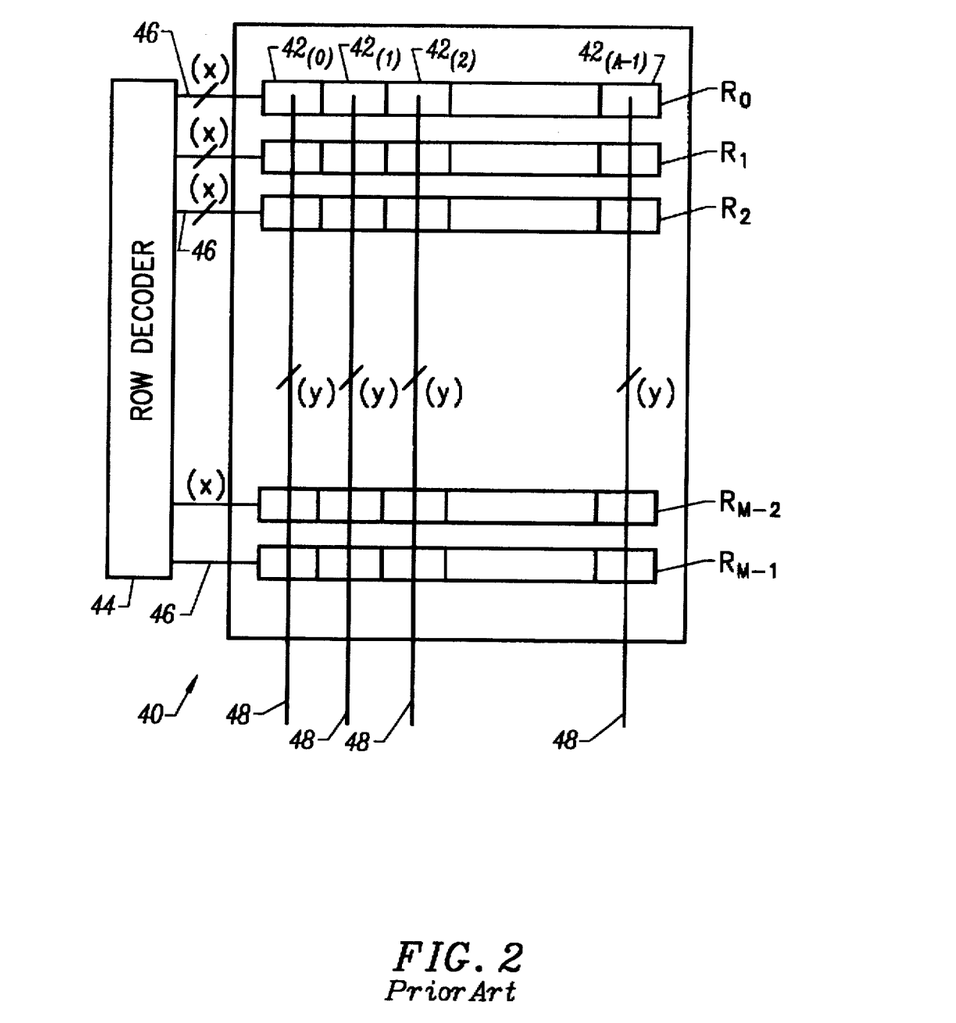
FIG. 2 illustrates a block diagram of an SRAM array used for the register file of prior art computer systems.

Referring to FIG. 2, a block diagram of an SRAM memory array typically used for storing the register values of the register file 28 is shown. The memory array 40 includes (m) rows. Each row $R_o$ through $R_{m-1}$ corresponds to a register in the register file 28. Each row R includes (n) memory cells $42_0$ through $42_{n-1}$, where (n) equals the width of the word size used by the processor 10. In the above-mentioned processors, the word size is either (n=32) bits or (n=64) bits, depending on the processor. The memory array 40 also includes a row decoder 44. A plurality (x) of word lines 46 are coupled between the row decoder 44 and each row $R_o$ through $R_{m-1}$ respectively. The memory array 40 typically includes a plurality (y) of differential bit lines 48 associated with each column of memory cells 42, running the height of the memory array 40. (Note, the plurality (x) of word lines 46 and the plurality (y) of differential bit lines are illustrated as only a single line respectively for the sake of clarity.) In the above-mentioned UltraSPARC integer register file for example, seven read word lines and three write words lines, or a total of ten (x=10) word lines 46, are needed for each row $R_o$ through $R_{m-1}$ in the array. Further, seven differential read bit lines and three differential write bit lines, or a total of twenty (y=20) bit lines are needed for each memory cell 42.

The SRAM memory array just described creates a number of problems. For each cell 42 in the array, two pass transistors are needed for each combination of a word line/ differential bit line pair. As a result, the size or pitch of each memory cell is relatively large because of the number of word lines, bit lines, and pass transistors associated with each memory cell. The increased pitch size of the individual cells means that the overall size of the memory array is larger and occupies a larger percentage of the area on the processor die. This detrimentally affects manufacturing yields of the processor, and drives up fabrication cost. The relatively large size of the memory array also adversely affects the average time required to access a register value in the register file 28 for several reasons. The longer word lines and bit lines, due to the overall larger size of the array, increases the average access time. The number of pass transistors, word lines, and bit lines associated with each cell tends to increase the capacitive loading on each cell. The increased capacitive load on each cell makes it more difficult for the finite charge stored in each cell to drive the appropriate differential bit line pair. All the above problems are exacerbated with an increase in the scalarity of the processor 10. For example, a five issue processor (i=5) additional read word lines, write word lines, and pairs of differential write bit lines would be needed, further adding to the above stated problems.

Several design trends are proliferating in the processor industry: greater scalarity; reduced cycle times; larger register files; and wider word widths. The implementation of the register file 28 in the SRAM memory array 40, with its complex read/write circuitry, relatively large size, and relatively slow access speeds, represents a substantial barrier to improving the performance in each of these attributes. In fact, the Applicants believe that the SRAM memory array 40 as described above has created a design impediment that in the next generation of processors, may discourage or even prevent further advancements in scalarity, an increase in word size, an increase in the size of the register file, and/or a reduction of cycle time. Accordingly, an improved apparatus and method for accessing register values is needed.

SUMMARY OF THE INVENTION

The present invention relates to a processor having a register file of registers and a dispatch unit capable of issuing up to (i) instructions of a program per cycle to an execution unit having (z) pipelines, wherein some of the instructions specify certain ones of the registers in the register file as source operands and designate certain ones of the registers in the register file as destination registers. The processor also includes a memory for storing the registers of the register file, the memory having (N) access ports configured to access up to (N) registers per cycle, where (N) is less than a maximum number of register values that may need to be accessed during a cycle. A worst case cycle is defined as a cycle wherein the largest possible number of source register values and/or destination register values that may be needed during a cycle.

The decode/dispatch unit is configured to dispatch the instructions of the program queued in an instruction buffer to the (z) pipelines in the execution unit. The decode/dispatch unit performs two functions that help alleviate a problem wherein the number of register values needed by a group of instructions considered for dispatch in a cycle exceeds the read port bandwidth (N) of the memory containing the register file (i.e., a bottleneck condition). In the first procedure, the decode/dispatch unit may re-order the issuance of instructions out of program order to avoid a bottleneck condition. In the second procedure, the decode/dispatch unit prefetches and stores register values that are needed in a subsequent cycle in which a bottleneck condition has been identified. When the instructions in the cycle that cause bottleneck condition issue, the prefetched and stored register values are provided to the execution unit. By prefetching register values, a bottleneck condition may be avoided. If neither procedure works in eliminating a bottleneck condition, one or more of the instructions in the cycle with the bottleneck may be stalled.

The number of read ports (N) use to access the register file is a design choice. By reducing the number of read ports to the memory containing the register file, many of the wiring problems discussed in the prior art are alleviated. For example, with fewer read ports into the register file, the pitch of each cell in the memory array can be made smaller because fewer word lines, bit lines and pass transistors are associated with each cell. Further, the amount of required peripheral circuitry, such as decoders and drivers, is reduced. All these factors permit the overall size of the memory array to be made smaller, which helps decrease the average access time of the memory and helps increase manufacturing yields. Many of the problems of prior art register files are therefore substantially eliminated by reducing the number of read ports to the register file.

DESCRIPTION OF THE DRAWINGS

The objects, features and advantages of the system of the present invention will be apparent from the following description in which.

DESCRIPTION OF THE PREFERRED EMBODIMENT

Figure 3:
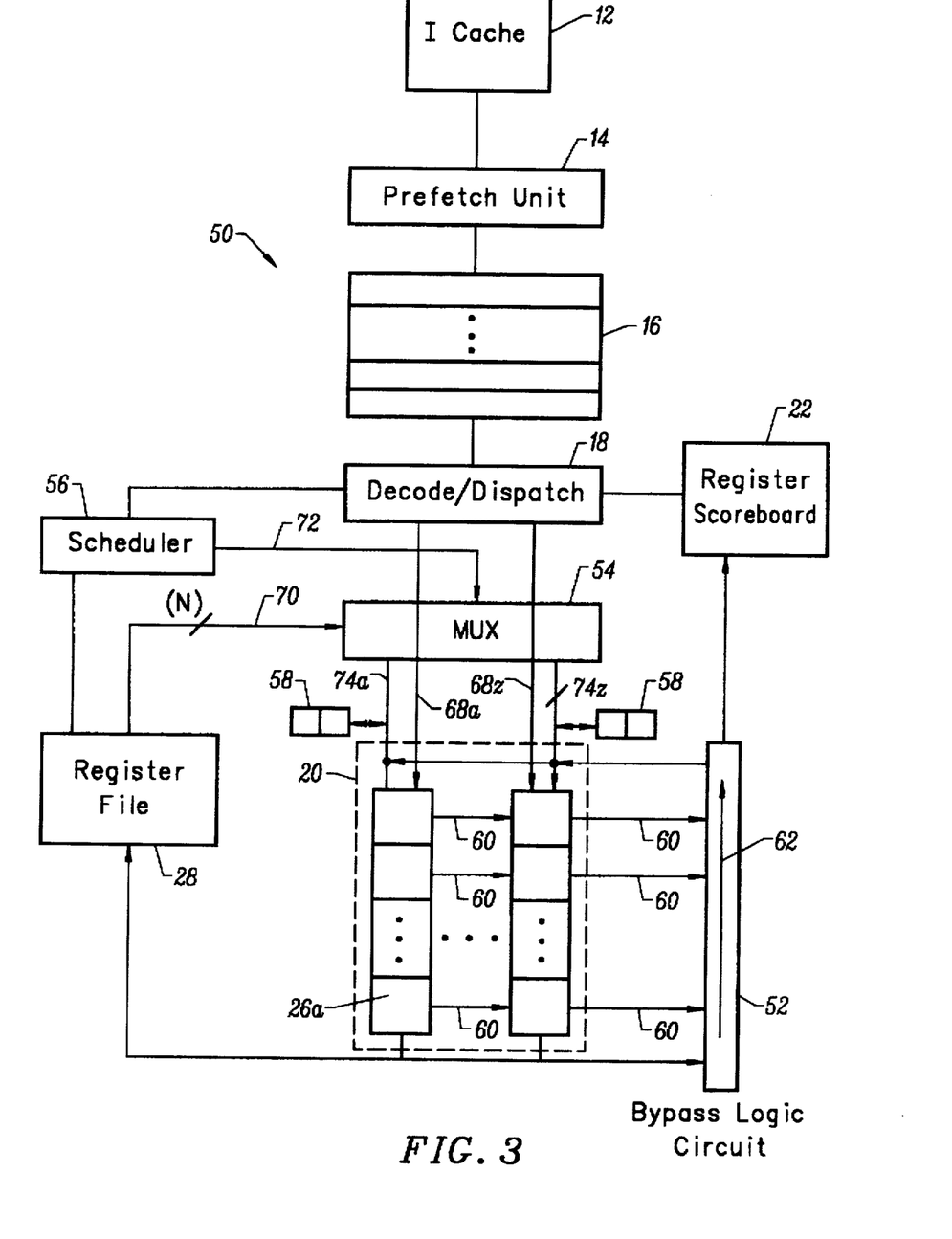
FIG. 3 illustrates a block diagram of a computer having a reduced read bandwidth register file according to present invention.

Referring to FIG. 3, a block diagram of a processor according to the present invention is shown. The processor 50 includes an instruction (1) cache 12, a prefetch unit 14, an instruction buffer 16, a decode/dispatch unit 18, an execution unit 20, including (z) pipelines 26a through 26z, a register scoreboard unit 22, and a register file 28 positioned on top of a memory hierarchy (not shown). Like elements that perform the same or a similar function as provided in FIG. 1, are designated by the same reference numerals in FIG. 3, and therefore are not described in detail herein. The processor 50 also includes a bypass logic circuit 52, a multiplexor (MUX) circuit 54, a scheduler 56, and a plurality of storage elements 58.

In each cycle, the decode/dispatch unit 18 ascertains the instructions among the next (i) instructions in the instruction buffer 16 that are going to be dispatched in the next cycle. The scheduler 56, under the direction of the decode/dispatch unit 18, fetches the needed register values from the register file 28 and provides the fetched register values to the data inputs 70 of the MUX 54. The MUX 54, in response to the select input 72 from the scheduler 56, directs the fetched register values to the proper one of the pipelines 26a through 26z or one of the memory locations 58 via data lines 74a through 74z respectively. Instructions are dispatched by the decode/dispatch unit 18 into the pipelines 26a through 26z via input lines 68a through 68z respectively.

The bypass logic circuit 52 is coupled to receive register values as they are recomputed in the various stages of the pipelines 26a through 26z. The arrows 60 represent the flow of recomputed register values to the bypass logic 52. Under the direction of the decode/dispatch unit 18 and the scoreboard 22, the bypass logic circuit 52 provides the recomputed register values back to the pipelines 26a through 26z as needed. The arrow 62, and the arrow 64 represents the flow of recomputed register values through the bypass logic 52 to the pipelines 26 in the execution unit 20 respectively.

The processor 50 differs from the prior art processor 10 in a significant way. The register file 28 has a reduced number (N) of read ports, where (N) is less than the largest possible number of source register values that may be needed form the register file 28 during a cycle. By reducing the number of read ports to the register file 28 to less than the maximum (X) and width required, many of the wiring and transistor count problems discussed in the prior art are alleviated. For example, with fewer read ports, the pitch of each cell in the memory array can be made smaller because fewer word lines, bit lines and pass transistors are associated with each cell in the memory. Further, the amount of required peripheral circuitry, such as decoders and drivers, is reduced. All these factors permit the overall size of the memory array containing the register file 28 to be made smaller, which helps decrease the average access time of the memory and helps increase manufacturing yields.

A drawback associated with reducing the read port bandwidth of register file 28 is that the number of read ports may not be large enough for a group of instructions considered for dispatch in a given cycle. In a two issue (i=2) processor for example, if two instructions are scheduled to be issued in a cycle, and both instructions require two (2) register values, then a total of four (4) source register values are needed from the register file 28. If the register file 28 has only two read ports (N=2), then a bottleneck condition exists in the cycle because the number of register values needed exceeds the number of available read ports to the register file 24. The bottleneck condition, if not somehow corrected, may cause the second instruction to be stalled and issued in a subsequent cycle.

The decode/dispatch unit 18 is programmed to perform two procedures that help to alleviate read port bottleneck condition at the memory containing the register file 28. In the first procedure, the decode/dispatch unit 18 may re-order the issuance of instructions out of program order in an attempt to avoid the bottleneck condition. In the second procedure, the decode/dispatch unit 18 prefetches and stores register values that are needed in a subsequent cycle identified as having a bottleneck condition in advance of the dispatch of the instructions that cause the bottleneck. To implement the second procedure, the register value requirements of each cycle are ascertained. If fewer than (N) register values are going to be accessed from the register file 28 during the current cycle, a "gap" in the read port bandwidth is said to exist. Next, the decode/dispatch unit 18 reviews the other instructions in the instruction buffer 16 and identifies a subsequent cycle in which a bottleneck condition will occur. If such a cycle is identified, the decode/dispatch unit 18 directs the scheduler 56 to prefetch the register value or values needed in for the subsequent cycle during the gap of the current cycle. The prefetched register value(s) is/are temporarily stored in the memory location(s) 58. When the instructions of the subsequent cycle issue, the register values stored in the memory location 58 are provided to the correct pipeline 26 that will execute the instruction that needs the prefetched register value(s). By prefetching register values, cycles that would otherwise have a bottleneck condition, may be avoided.

Operation of the present invention is best described using several examples. Consider a two issue (i=2), two scalar processor having a register file with two read ports (N=2). The three examples below, which rely on the following string of instructions, illustrate how bottleneck conditions at the read ports of the register file 28 may be eliminated during operation.

| | |
|---|---|
| I1. | ADD R1, R2 —> R3 |
| I2. | DIV R4, R5 —> R6 |
| I3. | IF Branch = 0, JMP to XXX |
| I4. | IF Branch ≠ 0, JMP to KKK |
| I5. | MOV R7 —> R8 |
| I6. | ADD R11, R12 —> R13 |
| I7. | MOV R14 —> R15 |

EXAMPLE 1

In the first cycle, the decode/dispatch unit 18 considers the first two instructions I1 and I2 for dispatch. Together, instructions I1 and I2 define four register values (R1, R2, R4 and R5) needed as source operands. Assuming the most up-to-date values for the four registers are in the register file 28, a bottleneck condition will exist at the read ports of the register file 28 if both these instructions are issued. In response, the decode/dispatch unit 18 considers a number of possibilities, depending on the state of the pipelines 26a and 26b. If both pipeline 26a and pipeline 26b are available for dispatch, then the decode/dispatch unit 18 directs the scheduler 56 to fetch register values R1 and R2 and issues the first instruction I1. The second instruction is then considered for dispatch in a subsequent cycle. On the otherhand, if the decode/dispatch unit 18, after performing a resource dependency check, realizes that the first pipeline 26a is stalled and can not accept a new instruction, then the decode/dispatch unit 18 directs the scheduler 56 to fetch register values R4 and R5 and issues the second instruction I2 to pipeline 26b. By shifting the dispatch of the second instruction I2 ahead of the first instruction I1 and out of program order, an instruction stall is avoided. It should be noted that under these circumstances, the second instruction I2 can be issued only if it is not dependent on the first instruction I1.

In yet another possibility, the decode/dispatch unit 18 may dispatch instructions I2 and I3. Since, instruction I3, which is a conditional branch, does not require any source register values, the register requirements of the two instructions does not exceed two (N=2). Accordingly, both instructions I2 and I3 may be issued ahead of instruction I1, provided neither instruction is dependant on I1.

EXAMPLE 2

Assuming only the second instruction I2 is dispatched in the first cycle and the first instruction I1 is stalled, the decode/dispatch unit 18 then considers the first instruction I1 and the third instruction I3 for dispatch in the second cycle. Since the third instruction I3 is a conditional branch that does not require any source operand register values, a bottleneck condition on the read ports of the register file 28 does not exist in the second cycle. Accordingly, the decode/dispatch unit 18 directs the scheduler 56 to fetch the register values R0 and R1 for the first instruction I1. Concurrently, the first instruction I1 and the third instruction I3 are dispatched in the second cycle. It should be noted that if the first instruction I1 was dispatched in the first cycle and not the second instruction I2, then the decode/dispatch unit 18 would fetch register values R4, R5 and dispatch the second instruction I2 and the third instruction I3 in the second cycle.

EXAMPLE 3

In the third cycle, the decode/dispatch unit 18 considers the fourth instruction I4 and the fifth instruction I5 for dispatch. The fourth instruction I4 is a branch that does not require any register values, and the fifth instruction I5 is a move that requires only one source register value R7. Since only one register value R7 is needed by the two instructions, a "gap" exists in the read port usage of the register file 28 during this cycle. When a gap is identified, the decode/dispatch unit 18 reviews the instructions queued in the instruction buffer 16. In reviewing the instructions that may issue in the fourth cycle, it is realized that three register values R11, R12 and R14 will be needed to issue instructions I6 and I7. Since three register values are needed, a bottleneck condition will exist in the fourth cycle. In this situation, the decode/dispatch unit 18 may direct the scheduler 56 to fetch register value R7 and to prefetch register value R11 in the third cycle, and issues instruction I4 and instruction I5 in the third cycle. The register value R7 is provided to the pipeline 26 in the execution unit 20 that is going to execute instruction I5. Register value R11, however, is stored in one of the storage elements 58. In the fourth cycle, register value R12 and register value R14 are fetched, and instruction I6 and instruction I7 are dispatched. By prefetching and storing register value R11, the three register values R11, R12, and R14 are available for instructions I6 and I7 in the fourth cycle. Accordingly, a bottleneck problem is avoided at the read ports of the register file 28, and the maximum number of possible instructions (i=2) are issued in the fourth cycle.

The number of stages in each pipeline 26 should be considered in selecting a value for (N). In a multi-pipeline processor having many stages in each pipeline 26, a relatively large number of register values may be contained in the execution unit 20 at any point in time. Based on the principles of spatial and temporal locality, the register values in the pipelines 26 tend to be more relevant to the instructions about to be issued, than the register values contained in the register file 28. It is therefore more likely that register values will be obtained from a bypassing operation than from the register file 28 in such processors. It is also important to realize that for the majority of instructions in a given program, two source register values are not required. On the contrary, a relatively large percentage of instructions in a program are typically either a load/store instruction, a branch instruction, a move instruction, or a no-op, etc., all of which require either zero (0) or one (1) register value operand. Between bypass operations and the fact that a large percentage of instructions typically do not require two source operands, it is a relatively uncommon event where the read port bandwidth (N) of the register file 28 is not sufficiently wide in a given cycle. Thus, for a relatively large number of cycles, the reduced read port bandwidth of the register file 28 does not create a problem. However, when there is a bottleneck condition, the two procedures described above help the correct the problem most of the time.

Figures 4A, 4B:
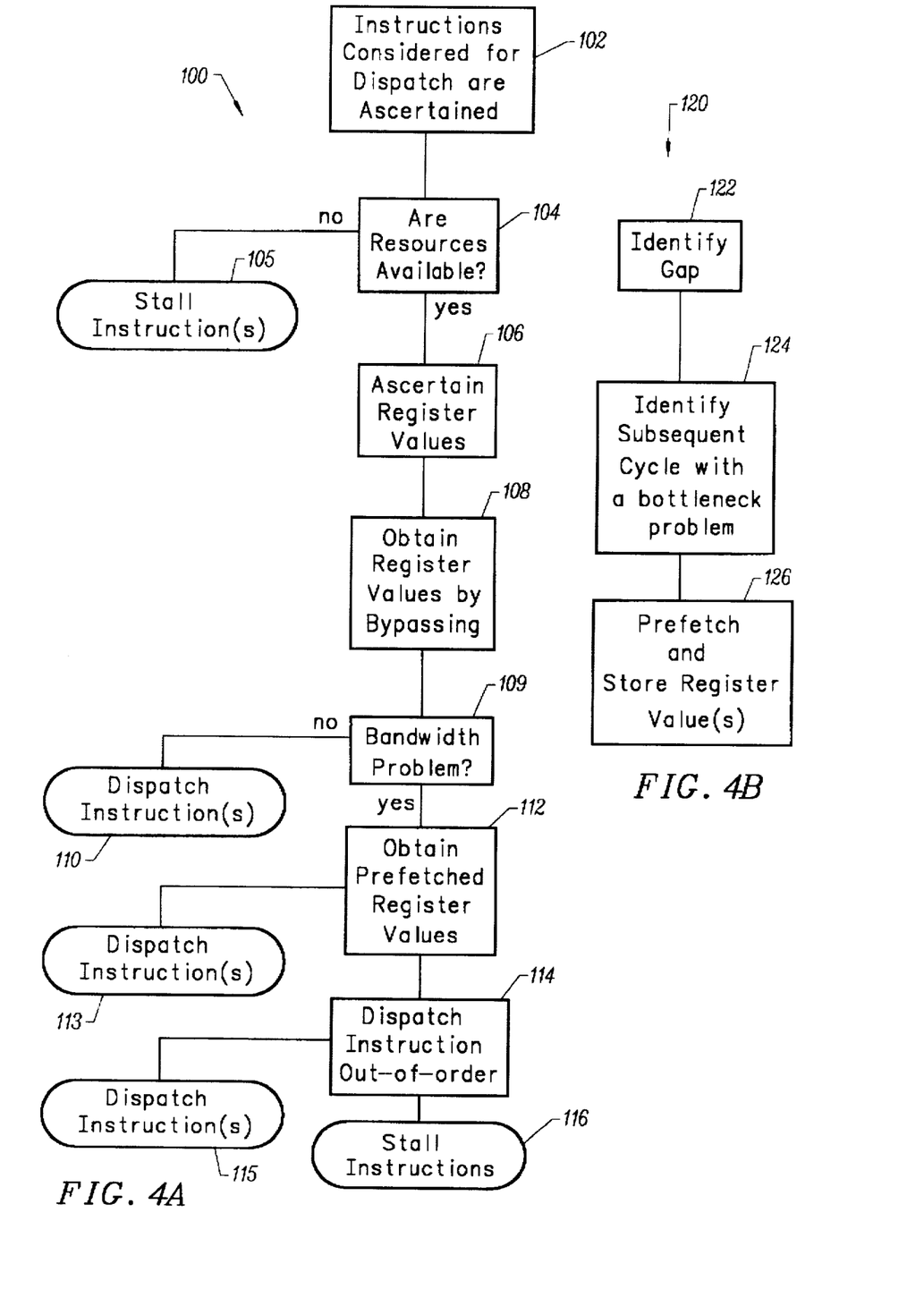
FIG. 4A illustrates a flow chart showing the operational steps of the computer according to the present invention.
FIG. 4B illustrates a flowchart describing the steps involved in the prefetching of register values.

Referring to FIG. 4A, a flow chart 100 illustrating the operation of the present invention is shown. The instructions in the instruction buffer 16 are first analyzed by the decode/ dispatch unit 18 and the instructions considered for dispatch in the next cycle are ascertained (box 102). Thereafter, a resource check is performed to determine if the resources are available to execute the instructions considered for dispatch in the next cycle (box 104). The instructions where resources are not available are stalled (oval 105). For all other instructions where resources are available, the source register values needed to execute the instructions are ascertained (box 106). Next, any needed register values available by a bypassing operation are acquired (box 108). Thereafter, a check is performed to determine if a bottleneck condition will exist on the read ports of the register file 28 in the cycle (box 109). If no bottleneck condition exists, the instructions are dispatched (oval 110). In the event a bottleneck condition does exist, one of the two above described procedures are attempted to alleviate the problem. First, any prefetched register values needed for execution are obtained (box 112). If the prefetching of register values alleviates the bottleneck, the instructions are dispatched (oval 113). If no register values were prefetched, or if a register value(s) were prefetched and a bottleneck condition still exits, then it is determined if the instructions can be re-arranged out of program order to avoid the bottleneck condition (box 114). If re-arranging the instructions alleviates the bottleneck, then the instructions are dispatched (oval 115). If the two procedures describe above do not alleviate the bottleneck, one or more of the instructions considered for dispatched may be stalled (box 116). The above process is repeated for each cycle during the execution of a program in the processor 50.

Referring to FIG. 4B, a flowchart 120 describing the steps involved in the prefetching of register values is shown. First, any read port gaps in the current cycle are identified (box 122). If a gap is identified, a subsequent cycle where a bottleneck problem may exist is identified (box 124). In the final step, the needed register value(s) is/are prefetched in the gap and stored (box 126). This process is also repeated for each cycle during the execution of a program the processor 50.

Although the foregoing invention has been described in detail with respect to specific embodiments, it will be apparent that certain changes and modifications to the invention may be made without departing from the spirit of the invention. The present invention may be practiced in of any scalar processor. Further, the present invention may be practiced in any multi-issue processor. For example, in a four issue processor (i=4), the read port register bandwidth may be two (N=2), five (N=5), or six (N=6). In a five issue (i=5) or a six issue (i=6) processor, the read port register bandwidth may be two (N=2), five (N=5), six (N=6), or eight (N=8). The Applicants believe that the present invention would also be particularly applicable in very long instruction word (VLIW) or similar processors, where the number of instruction considered for dispatch in a cycle is relatively much higher than the state of the art processors of today. The reduced read and write port bandwidth may be equally applied to the memories that store both the integer register file and the floating point register file. Lastly, although not described in detail herein, the principles of the present invention may also be used for reducing the number of write ports associated with the register file 28. For example, in a (i) issue processor, the number of write ports (m) may range from one (M=1) to one less then the maximum number of write ports needed in a worst case cycle. It is intended that the specification be only exemplary, and that the true scope and spirit of the invention be indicated by the following claims.

What is claimed is:

1. A processor having a register file of registers and a dispatch unit capable of issuing up to (i) instructions of a program per cycle to an execution unit having (z) pipelines, wherein some of the instructions specify certain ones of the registers in the register file as source operands and designate certain ones of the registers in the register file as destination registers, the processor having a worst case maximum (X) of register values that may need to be accessed during a cycle for a given instruction set, the processor comprising:

a memory for storing the registers of the register file, the memory having (N) access ports configured to access up to (N) registers per cycle, where (N) is less than (X);

an instruction buffer configured to queue the instructions of the program to be dispatched to the execution unit;

a dispatch unit configured to consider the next (i) instructions in the queue of the instruction buffer for dispatch in a next cycle, the dispatch unit further configured to ascertain the register values needed by the next (i) instructions from the memory storing the register file in the next cycle, and configured to determine if a bottleneck condition will exist on the read ports of the memory storing the register file if the next (i) instructions are dispatched in the next cycle; and a bypass logic circuit configured to receive recomputed register values from the (z) pipelines of the execution unit of the processor, the dispatch logic further configured to instruct the bypass logic circuit to direct certain ones of the recomputed register values back to the (z) pipelines of the execution unit so that the selected ones of the recomputed register values are available to certain ones of the next instructions considered for dispatch if needed.

2. The processor of claim 1, wherein the (N) access ports are read ports for reading register values from the memory storing the registers of the register file.

3. The processor of claim 1, wherein the (N) access ports are write ports for writing register values to the memory storing the registers of the register file.

4. The processor of claim 1, further comprising a register scoreboard unit configured to maintain a table of the current status of all the register values of the register file in the pipelines of the execution unit of the processor during execution of the program.

5. The processor of claim 1, further comprising a scheduler, coupled to the dispatch unit, the scheduler configured to schedule the access of register values from the memory storing the registers of the register file under the direction of the dispatch unit.

6. The processor of claim 5, further comprising a multiplexor, coupled to receive the register values from the memory storing the register file, and a select input from the scheduler, the multiplexor further configured to direct the received register values to one of the (z) pipelines of the execution unit in response to the select input from the scheduler.

7. The processor of claim 5, further comprising a storage element configured to store a prefetched register value that has been prefetched from the memory storing the register file in anticipation that one of the instructions queued in the instruction buffer will need the prefetched register value when the one instruction is dispatched.

8. The processor of claim 1, wherein the dispatch unit is further configured to resolve an identified bottleneck condition on the (N) read ports of the memory storing the register file when the number of register values needed exceeds the number (N) of read ports (N) of the memory storing the register the file in a given cycle.

9. The processor of claim 8, wherein the dispatch unit is further configured to resolve identified bottleneck conditions by initiating a bypass operation.

10. The processor of claim 8, wherein the dispatch unit is further configured to resolve the identified bottleneck condition by initiating a prefetch operation to prefetch a needed register value from the memory storing the register file so that the needed register value is obtained in advance of the dispatch of the instructions that will cause the identified bottleneck condition, thereby alleviating the bottleneck condition.

11. The processor of claim 8, wherein the dispatch unit is further configured to resolve the identified bottleneck conditions by dispatching a younger instructions before an older instruction out of program order when a resource is not available to execute the older instruction and the younger instruction is not dependent on the older instruction.

12. The processor of claim 8, wherein the dispatch unit is further configured to stall the dispatch of an instruction when the identified bottleneck condition can not be resolved.

13. A method of providing a processor having a register file of registers and a dispatch unit capable of issuing up to (i) instructions of a program per cycle to an execution unit having (z) pipelines, wherein some of the instructions specify certain ones of the registers in the register file as source operands and designate certain ones of the registers in the register file as destination registers, the processor having a worst case maximum (X) of register values that may need to be accessed during a cycle for a given instruction set, the method comprising the steps of:

providing a memory for storing the registers of the register file, the memory having (N) access ports configured to access up to (N) registers per cycle, where (N) is less than (X);

providing an instruction buffer configured to queue the instructions of the program to be dispatched to the execution unit;

providing a dispatch unit configured to consider the next (i) instructions in the queue for dispatch in a next cycle, the dispatch unit further configured to ascertain the register values needed by the next (i) instructions from the memory storing the register file in the next cycle, and configured to determine if a bottleneck condition will exist on the read ports of the memory storing the register file if the next (i) instructions are dispatched in the next cycle, wherein the provided dispatch unit is further configured to resolve an identified bottleneck condition on the (N) read ports of the memory storing the register file when the number of register values needed exceeds the number (N) of read ports (N) of the memory storing the register the file in a given cycle and wherein the provided dispatch unit is further configured to resolve identified bottleneck conditions by initiating a bypass operation.

14. The method of claim 13, wherein the provided dispatch unit is further configured to resolve the identified bottleneck condition by initiating a prefetch operation to prefetch a needed register value from the memory storing the register file so that the needed register value is obtained in advance of the dispatch of the instructions that will cause the identified bottleneck condition, thereby alleviating the bottleneck condition.

15. The method of claim 14, wherein the provided dispatch unit is further configured to resolve the identified bottleneck conditions by dispatching a younger instructions before an older instruction out of program order when a resource is not available to execute the older instruction and the younger instruction is not dependent on the older instruction.

16. A method of operating a processor having a register file of registers and a dispatch unit capable of issuing up to (i) instructions of a program per cycle to an execution unit having (z) pipelines, wherein some of the instructions specify certain ones of the registers in the register file as source operands and designate certain ones of the registers in the register file as destination registers, the processor having a worst case maximum (X) of register values that may need to be accessed during a cycle for a given instruction set, the method comprising the steps of:

accessing a memory for storing the registers of the register file, the memory having (N) access ports configured to access up to (N) registers per cycle, where (N) is less than (X);

ascertaining the register values needed by the instructions considered for dispatch in a current cycle, determining which of the register values needed by the instructions considered for dispatch in the current cycle can be obtained by a bypassing operation, and ascertaining whether the number of register values needed in the current cycle exceeds the register read ports (N) of the memory storing the registers of the register file.

17. The method of claim 16, further comprising the step of issuing instructions out of program order in situations where the number of register values needed in the first cycle exceeds the register read ports (N) of the memory storing the registers of the register file.

18. The method of claim 16, further comprising the step of prefetching register values in situations where the number of register values needed in the first cycle exceeds the register read ports (N) of the memory storing the registers of the register file.

* * * * *